United States Patent Office 3,816,568
Patented June 11, 1974

3,816,568
N,N'-DIARYLOXAMIDES CONTAINING PHOSPHORUS
Kurt Hofer, Muenchenstein, Basel-Land, and Rudolf Moesch, Stein, Aargau, Switzerland, assignors to Sandoz Ltd., Basel, Switzerland
No Drawing. Filed Oct. 13, 1971, Ser. No. 189,022
Claims priority, application Switzerland, Oct. 13, 1970, 15,109/70
Int. Cl. C07f 9/08
U.S. Cl. 260—944
15 Claims

ABSTRACT OF THE DISCLOSURE

Organic phosphorus compounds of the formula

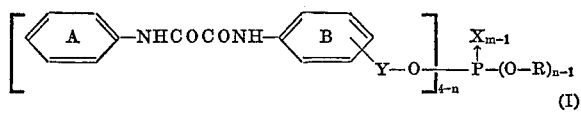

(I)

where the benzene nuclei A and B may be substituted,
m stands for 1 or 2,
n for 1, 2 or 3,
R for hydrogen or an alkyl, cycloalkyl or phenyl radical which may be substituted,
X for O or S, and
Y for the direct single bond or an alkylene radical which is bound directly or through an O or S atom to the benzene nucleus B and may be interrupted by O atoms.
which protect sensitive organic materials, notably plastics, from the detrimental action of light, heat and oxygen.

---

This invention relates to a process for the production of new organic phosphorus compounds of formula

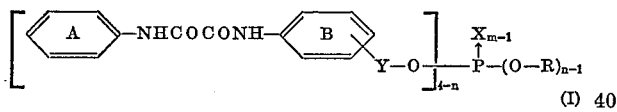

(I)

where the benzene nuclei A and B may be substituted,
m stands for 1 or 2,
n for 1, 2, or 3,
R for hydrogen or an alkyl, cycloalkyl or phenyl radical which may be substituted,
X for O or S, and
Y for the direct single bond or an alkylene radical which is bound directly or through an O or S atom to the benzene nucleus B and may be interrupted by O atoms.

The process for the production of these compounds is characterized by the esterification of 4-n mols of a compound of formula

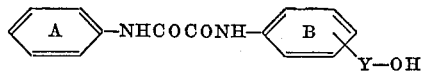
(II)

with 1 mol of a compound of formula

(III)

where Hal represents halogen, and when n stands for 2 or 3, by subsequent reaction with 1 or 2 mols of a compound of formula $$HOR \quad (IV);$$

or by transesterification of 4-n mols of a compound of formula (II) with 1 mol of a compound of formula

(V)

where $R_1$ stands for an alkyl, cycloalkyl or phenyl radical which may be substituted;

or by reaction of 1 mol of a compound of formula (II) with 1 mol of a compound of formula

(VI);

or by reaction of 2 mols of a compound of formula (II) with 1 mol of a compound of formula

(VII).

The benzene nuclei A and B in formulae (I) and (II) may be unsubstituted or substituted. Suitable substituents include straight or branched alkyl and alkoxy radicals, cycloalkyl radicals and halogens. In the preferred compounds of formula (I) the benzene ring A is substituted by one or two alkyl radicals containing not more than 9 carbon atoms, by one or two alkoxy radicals containing not more than 16 carbon atoms and/or by one hydroxyl group, which is in ortho-position to the N atom or to a tertiary alkyl radical. The benzene ring B is preferably unsubstituted or substituted by a methyl group, m is preferably 1 and n the number 1 or 2. Y is preferably the direct linkage, though it may represent ethylene, 1,2-propylene, 1,3-propylene, 1,4-butylene, —O—CH₂.CH₂—, $$-O-CH_2-CH-,$$
$$\qquad\qquad |$$
$$\qquad\qquad CH_3$$

$-O-CH_2-CH_2-CH_2-$, $-O-(CH_2)_6-$,
$-(O-CH_2-CH_2)_2-$, $-(O-CH_2-CH_2)_3-$,
$-(O-CH_2-CH_2)_4-$,
$-(O-CH_2-CH)_3-$,
$\qquad\qquad |$
$\qquad\qquad CH_3$
$-S-CH_2-CH_2-O-CH_2-CH_2-$ or
$-S-CH_2-CH-.$
$\qquad |$
$\qquad CH_3$ Examples of unsubstituted or substituted alkyl radicals R and substituents on the benzene nuclei A and B are methyl, ethyl, n-propyl, iso-propyl, n-butyl, iso-butyl, sec. butyl, tert.butyl, n-amyl, sec.amyl, iso-amyl, tert.amyl, n-hexyl, n-heptyl, n-octyl, 2-octoyl, 2-ethylhexyl, tert. nonyl, n-decyl, n-dodecyl, tert.dodecyl, n-tetradecyl, cetyl, stearyl, behenyl, trifluoromethyl, 2,2-difluoroethyl, 2-cyanethyl, 2-methoxyethyl, 2-ethoxyethyl, 2-n-butoxyethyl, 3-methoxypropyl, 2-(2'-ethoxyethoxy)ethyl, 2-(2'-n-butoxyethoxy)-ethyl, 2-methylmercaptoethyl, 3-methylmercaptopropyl and tetrahydrofurfuryl. Alkyl radicals which, together with any substituents present, contain not more than 8 carbon atoms are preferred.

Suitable cycloalkly radicals R or substituents on the benzene nuclei A and B of formula (I) are, for example, cyclopentyl, cycloheptyl and in particular unsubstituted or substituted cyclohexyl radicals such as cyclohexyl itself, 4-methylcyclohexyl, 2,5-, 2,6,- 3,4- and 3,5-dimethylcyclohexyl.

The preferred meaning of R is hydrogen.

Like the alkyl radicals in the general formula (I), the alkoxy radicals in the benzene nuclei A and B, jointly with any substituents present, may bear 1 to 22 or preferably 1 to 8 carbon atoms. The following may be named as examples: methoxy, ethoxy, n-propoxy, iso-propoxy, n-butoxy, iso-butoxy, tert.butoxy, sec.butoxy, n-amyloxy, iso-amyloxy, tert.amyloxy, n-hexyloxy, n-octyloxy, 2-octyloxy, 2-ethylhexyloxy, n-decyloxy, n-dodecyloy, tert.dodecyloxy, cetyloxy, stearyloxy, behenyloxy, methoxyethoxy, 2-n-butoxyethoxy, 2 - cyanethoxy, 2-(2'-ethoxyethoxy)-ethoxy and 2-(2'-n-butoxyethoxy)-ethoxy.

As a substituent in the benzene nuclei A and B, halogen may represent, for example, bromine or preferably chlorine.

Especially valuable compounds of formula (I) are those in which both $m$ and $n$ stand for 1 and those in which $m$ stands for 1 and $n$ for 2.

The starting compounds of formulae (II), (III), IV), (V), (VI) and (VII) are known or can be produced in analogy with known methods. The aforedescribed process of production involves the synthesis of the esters of pohsphorous, phosphoric or thiophosphoric acid. These syntheses proceed in analogy with known methods, which are collectively described in the literature, cf. K. Sasse, "Organische Derivative Phosphorhaltiger Mineralsäuren" im Handbuch der "Methoden der Organischen Chemie" (Houben-Weyl), 4th impression, vol. XII/2, Part 2, pp. 5–82, 143–208, 226–274, 299–374, 587, 598–602 and 623–651.

Phosphorous acid esters of formula (I) in which $m$ stands for 1 and $n$ for 3 can be obtained by reacting a compound of formula (II) with excess phosphorus trichloride to the corresponding phosphorous acid ester dichloride to compound of formula

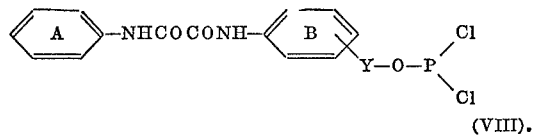

(VIII).

For this reaction it is convenient to enter the phosphorus trichloride into the vessel first and then to add gradually the hydroxyl compound of formula (II), using the phosphorus trichloride in at least four times the molar excess. The reaction is carried out in the absence of moisture. The optimum starting temperature is 20–30° C. and towards the end of the reaction the temperature is raised higher, if necessary to the boiling point of the phosphorus trichloride, until the hydroxyl compound disappears and the reaction is completed. If a compound of formula (II) containing the phenolic hydroxyl group is reacted, the reaction proceeds at a relatively slow rate, so in such cases catalysts such as magnesium chloride can be used. If a compound of formula (II) containing an alcoholic hydroxy group is reacted it is advisable to remove from reaction the hydrogen chloride formed as by-products, either by introducing an inert gas or by adding an agent which binds acid, such as a tertiary amine or pyridine. Further, to prevent side-reactions it is advisable to commence at low temperature, for example at 0 to −15° C. These reactions run analogously when phosphorus tribromide is used in place of phosphorus trichloride, the resulting compounds of formula (VIII) having two bromine atoms instead of chlorine atoms.

The halogen atoms in the compounds of formula (VIII) can be replaced by hydroxyl groups, in which case the final products are phosphorous acid monoesters. It is advisable to carry out this hydrolysis with the theoretical amount of water and to neutralize the hydrochloric acid formed, either during or immediately after the reaction, with an acid-binding agent such as pyridine. By taking this precaution decomposition of the phosphorous acid monoester can be avoided.

The latter have one of the following structural formulae:

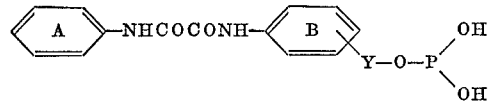

(IXa)

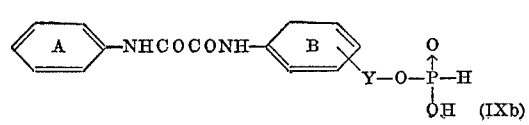

(IXb)

Alternatively, the intermediates of formula (VIII) can be reacted with unsubstituted or substituted phenols to yield compounds of formula (I) in which $m$ stands for 1, $n$ for 3 and R for unsubstituted phenyl. This reaction can be carried out with the theoretical amount or with an excess of the selected phenol. The reaction temperature has to be high, e.g. 100–180° C., depending on the acidity of the starting phenol. Phenols of higher acidity necessitate heating to more elevated temperatures to reach the end-point of the reaction. In this mode of operation hydrogen halide is split off and escapes from the reaction mixture. In order to avoid hydrolytic side-reactions it is important to exclude moisture in this reaction. Acid-binding agents can be used to bind the freed hydrogen halide. This variant mode of operation of the process is preferred for reacting compounds of formula (VIII) with alcohols instead of phenols, which results in compounds of formula (I) in which $m$ stands for 1, $n$ for 3 and R for unsubstituted or substituted alkyl radicals. Asymmetrical phosphorous acid triesters of this type in which the R of formula (I) represents an alkyl radical having at least 6 carbon atoms are highly effective stabilizers for polyalkylenes as they are well soluble in these polymers and do not migrate.

Working in analogy with the procedure yielding the aforedescribed phosphorous acid ester dihalides of formula (VIII), phosphorus diester halides of formula

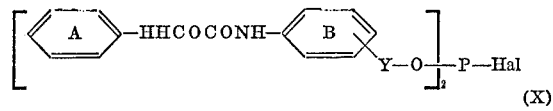

(X)

can be obtained. In these intermediates again the halogen atoms may be replaced by unsubstituted or substituted phenoxy or alkoxy radicals, as stated above in reference to compounds of formula (VIII). In this way final products of formula (I) are formed in which $m$ is 1 and $n$ is 2.

If the halogen atom in the phosphorous acid diester halides of formula (X) is replaced by the hydroxyl group, the corresponding phosphorous acid diesters are obtained. This transformation takes place fairly easily at room temperature or with cooling to lower temperatures, using the theoretical amount of water and if necessary an acid-binding agent such as a trialkylamine. The same esters are formed when compounds of formula (X) are reacted with alcohols instead of water in the absence of acid-binding agent, the alcohols being converted into the corresponding alkyl halides.

Compounds of formula (I) in which $m$ and $n$ both denote the value 1 are obtained when 3 mols of a compound of formula (II) are reacted with 1 mol of a phosphorus halide, preferably phosphorous trichloride. If compounds of formula (II) containing phenolic hydroxyl groups are employed for this reaction it does not proceed at any great speed and generally it is necessary to raise the tempertaure to about 100° to 200° C. in order to reach the end-point. Under these conditions the hydrogen halide split off in the reaction escapes from the mixture. In order to promote its escape the reaction can be carried out in the presence of an inert solvent such as an aromatic hydrocarbon of high boiling point so that the mixture remains of thinly liquid consistency to the end of the reaction. If starting compounds of formula (II) containing alcoholic hydroxyl groups are chosen, an acid-binding agent such as a trialkylamine is necessary to bind the hydrohalic acid formed as by-product.

Starting from phosphorus trihalides and a mixture of different hydroxyoxamides of formula (II) and working in an analogous way, asymmetrical phosphorous acid esters or mixtures of esters of phosphorous acid can be produced which conform to formula (I) with 1 as the meaning of both $m$ and $n$. Similarly, asymmetrical esters of phosphorous acid are formed when a phosphorous trihalide is reacted with a mixture of hydroxyl compounds of formulae (II) and (IV).

In the modes of operation of the process so far described the phosphorus halides serve as a starting basis. It is however possible to start from esters of phosphorous acid agreeing with formula (V), in which $m$ represents the number 1. Transesterification of these with compounds of formula (II) yields new esters of phosphorous acid conforming to the present invention. It is of advantage to use a catalyst to accelerate the transesterification reaction, for example sodium phenolate, lead suboxide, calcium acetate, antimony trioxide or aluminium chloride. In order to shift the reaction equilibrium as far as possible to the desired side, the hydroxyl compound which is split off from the starting ester during the reaction can be continuously removed, for example by distillation in high vacuum.

The aforestated esters of phosphorous acid which still contain oxamide groups can also be used as starting materials for the production of phosphoric acid esters containing oxamide groups. This transformation of compounds with trivalent phosphorus into others with quinquevalent can be carried out with many diverse oxidizing agents. For example, the starting compounds can be oxidized with sodium hypochlorite or hydrogen peroxide in almost neutral suspension. Generally the temperature for such reactions should be only moderate, preferably below 50–60° C., to prevent side-reactions due to hydrolysis. It is often necessary to work in a water-free medium to exclude side-reactions completely. For example, oxygen can be used for oxidation, which means that the temperature has to be increased to at least 70° C. for sufficiently rapid reaction. But if the medium is irradiated with actinic light at the same time sufficiently rapid oxidation can be achieved at room temperature or 30–40° C. Given the absence of moisture, sulphuryl chloride can be used for oxidation.

The phosphorous acid triesters described in the foregoing are also suitable as intermediates for the synthesis of the corresponding thiophosphoric acid-O,O,O-triesters. This addition of sulphur takes place very easily with phosphorous acid tiesters derived from alcohols. The reaction is exothermic and must be carried out with cooling to preclude side-reactions, notably rearrangement to O,O,S isomers. It is conducted preferably in solvents such as benzene, ethanol or chloroform in the absence of water. If the sulphur is to be added on phosphorous acid triesters derived from phenols, higher temperatures ranging from 100° to 200° C. are necessary. In these cases the solvent can normally be omitted, the reaction then being carried out in the melt. Under these conditions there is no danger of isomerization to O,O,S triesters.

These thiophosphoric acid esters can also be produced by reacting thiophosphoric acid chloride with compounds of formula (II), if desired in mixture with compounds of formula (IV). As the rate of reaction is relatively slow, the hydroxyl compounds have to be employed in the form of their alkali salts, or alternatively catalysts such as phosphorous trichloride, pyridine or copper powder have to be used.

The analogous reaction in which phosphorus oxychloride is used in place of thiophosphoric acid chloride proceeds very much easier and leads to the corresponding phosphoric acid esters, which as stated above are also obtainable from the corresponding esters of phosphorous acid by oxidation.

The present invention relates further to the new N,N'-diaryloxamides containing phosphorus and their use for the stabilization of organic materials, especially plastics. Of the various materials suitable for stabilization with the disclosed compounds, the following may be named: cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamineformaldehyde resins, urea-formaldehyde resins, allyl casting resins, polymethyl methacrylate, polyesters rubber, cellulose, wool and silk can be stabilized with these compounds.

The aforementioned materials may be present in the form of film or sheet, rod, tape, panels, coatings, fibres, granules, powders or other processing forms, or as solutions, emulsions or dispersions. The disclosed compounds are incorporated in or coated on the materials by one of the known methods. One important method of application consists in intimate blending of the stabilizing compound with the material, for example polypropylene granules, in a kneading mill or other suitable machine and subsequent extrusion. In this way very homogeneous mixing is obtained which is important for effective protection. The mixture can be extruded in various forms, for example as film, tubing or filaments. The latter can be processed as woven textile fabrics. In this method of application the stabilizer is blended with the polypropylene before it is converted into textiles. The new stabilizers can also be applied to textile yarns and fabrics, for example from extremely fine dispersion in water. This method of application is suitable for textiles of polyethylene terephthalate and cellulose acetate fibres. The new stabilizers need not necessarily be added to the final polymer; they can be blended with the monomers or prepolymers prior to the synthesis giving the final polymer.

Besides their uses in clear films, plastics and the like, the disclosed compounds are applicable in opaque, semi-opaque and translucent materials having surface which is subject to degradation by ultra-violet radiation, atmospheric oxygen and heat. These materials include foamed plastics, opaque films and coatings, opaque papers, opaque and translucent pigmented plastics, fluorescent pigments, automobile and furniture polishes, creams, lotions and similar products, either clear, translucent or opaque.

The compounds of formula (I) can be employed in combination with other ultra-violet absorbers and stabilizers. Such mixtures of active substances often have a synergistic effect and safeguard the material against degradation by ultra-violet rays, visible light, heat and atmospheric oxygen over a long period of time.

It is not always necessary to incorporate the compounds in or apply them to the material for protection. Some classes of product, for instance light-sensitive foods such as fruit, cooking oil and butter, can be protected by packaging in plastic film containing a compound of the disclosed type.

Normally the compounds of formula (I) stabilize the material against the destructive action of ultra-violet rays, visible light, air and heat. This wide range of effectiveness makes them particularly valuable. In this respect they are superior to the N,N'-diphenyloxamides known to date, which provide protection against ultra-violet radiation but are far less effective in preventing oxidative degradation by air and attack by heat.

It is not essential to produce the compounds of formula (I) in the pure form to be satisfactory stabilizers. The 2-methyl-3'-hydroxy-N,N'-diphenyloxamide of formula

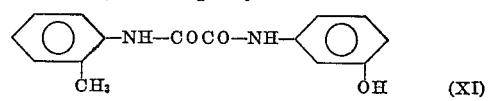

(XI)

for instance, can be mixed with tricresyl phosphate in the molar ratio of 1:4 and transesterified with heating, if necessary in the presence of a catalyst such as lithium hydride or lead (II) oxide, and with continuous removal of the liberated cresol by vacuum distillation. A mixture of esters, predominantly the ester of formula

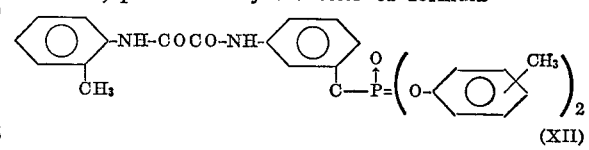

(XII)

is obtained in tricresyl phosphate solution in excellent yield. The solution can be incorporated in polymers such as polyvinyl chloride or polyalkylenes, either as obtained or after dilution with further tricresyl phosphate. It acts both as stabilizer and plasticizer in these polymers. This mode of production yielding a solution of compounds of the formula (XII) type is highly economical as the reaction is almost quantitative and involves no loss through isolation and purification. Moreover, stabilizer solution of this nature can be homogeneously dispersed in the polymer with ease.

An analogous procedure can be employed to produce the new esters of phosphorous acid. For instance, 2-methoxy - 4'-(hydroxyethoxy)-N,N'-diphenyloxamide and tributyl phosphite in excess can be reacted with heating and continuous removal by vacuum distillation of the butanol split off in the reaction; the product is a solution in tributyl phosphite of a phosphorous acid ester of formula

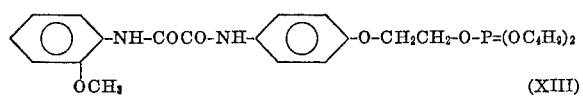

(XIII)

The phosphoric ester grouping in the compounds of formulae (XII) and (XIII) not only imparts stabilizing properties to the action of air and heat, but also increases the solubility and the migration resistance in hydrophobic polymers such as polyvinyl chloride and polyalkylenes.

The present invention relates further to the organic materials which contain compounds of formula (I) for protection against light, air and heat. As shown in the few examples cited above, these compounds can be incorporated in the materials by standard methods at any stage of processing, and the amounts used may vary within wide limits, e.g. from 0.01 to 5% or preferably 0.05 to 1% relative to the weight of the material.

In the following Examples the parts are by weight and the temperatures in degrees centigrade; m.p. denotes the melting point $\lambda_{max}$, the wavelength of maximum light absorption in nanometer units.

EXAMPLES OF THE PROCESS OF PRODUCTION

Example 1

In a vessel fitted with reflux condenser, thermometer and stirrer 85.4 parts of 2-ethyl-4'-hydroxy-N,N'-diphenyloxamide, m.p. 211–212°, 450 parts of chlorobenzene and 23.7 parts of pyridine are mixed and raised to the boiling point in the absence of moisture. (In place of chlorobenzene, xylene or anisol can be used as solvent). At boiling temperature the greater part of the oxamide goes into solution. After cooling to 70–80°, 13.8 parts of phosphorus trichloride are slowly added, on which the temperature is again raised to the boiling point. A white precipitate gradually settles out, which grows denser as the reaction continues. After 30 minutes at the boil the end-point of the reaction is reached and the mixture is allowed to cool to room temperature. The white slurry is filtered with suction, entered into a vessel with stirrer containing about 500 parts of water at 30–40° and thoroughly stirred filtered again with suction, washed with cold water till the water is of neutral reaction, and dried with vacuum.

A colourless, crystalline triphosphite is obtained which has the formula

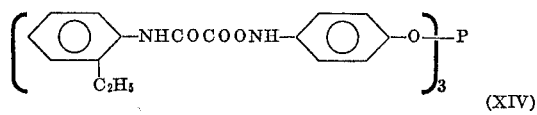

(XIV)

Melting point: 226–229°.

Elementary analysis: Calc.: C: 65.4; H: 5.1; N: 9.5; P: 3.5%. Found: C: 65.0; H: 5.2; N: 9.4; P: 3.4%.

Thin layer chromatogram

Absorption layer: silica gel.
Eluent: chloroform/tetrahydrofuran 9:1.
Flow time: 30 minutes.
Development: chlorine/o-tolidine solution.
Main product: hRf 71.
In addition minor impurities are present.

The above product can also be obtained by reacting 2-ethyl-4'-hydroxy-N,N'-diphenyloxamide with phosphorus trichloride in boiling chlorobenzene without the addition of a base, the hydrochloric acid formed being removed from the mixture by means of a current of nitrogen gas. The reaction time is longer in this case and the proportion of by-products higher.

Example 2

In the absence of moisture a mixture of 28.4 parts of 2 - ethyl - 4'-hydroxy-N,N'-diphenyloxamide, m.p. 211–212°, 31 parts of triphenyl phosphite and 0.5 parts of sodium methylate is set with 80–100 parts of diphenyl ether. The batch is reacted for 2½–3 hours at 150–160° with stirring and with vacuum, the vacuum being adjusted so that some diphenyl ether is continuously distilled throughout, along with the phenol split off in the reaction.

The reaction mixture is triturated with ethanol and a little water, after which it is filtered with suction, triturated with ethanol, filtered and dried. The yellowish crystalline product consists of a mixture of the compounds (XV) and (XVI) in the quantitative ratio 3:2.

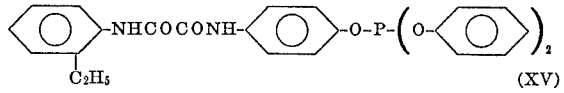

(XV)

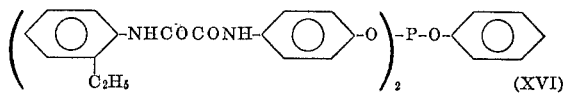

(XVI)

Elementary analysis: Calc.: C: 65.4; H: 5.6; N: 7.0; P: 5.8%. Found: C: 65.7; H: 5.1; N: 6.7; P: 5.6%.

Example 3

The procedure of Example 1 is employed with 94.2 parts of 2-propoxy-4'-hydroxy-N,N'-diphenyloxymide, M.P. 173–176°, and 13.7 parts of phosphorus trichloride in 400 parts of chlorobenzene and 23.7 parts of pyridine. The pyridine hydrochloride formed settles out from the pale boiling solution to be deposited on the wall of the reaction vessel. When the end-point of the reaction is reached the batch is allowed to cool to room temperature, on which a pale beige precipitate settles out. It is filtered with suction, thoroughly washed with water at 40–50° till neutral, filtered again with suction and dried at 80° with vacuum. Finally it is recrystallized from dioxan solution by the addition of water to the commencement of turbidity. The colourless crystalline tri-(2'-propoxy-N,N'-diphenyloxamidyl-4)-phosphite of formula

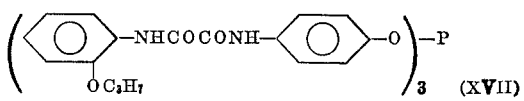

(XVII)

is obtained, which melts at 189–195°.

Example 4

In the absence of moisture 115.2 parts of 4,4'-dihydroxy-3,5-di-(tert. butyl)-N,N' - diphenyloxamide, M.P. 198–202°, 250 parts of chlorobenzene and 23.7 parts of pyridine are mixed for 10 minutes at 120–130°. The mixture is cooled to 70–75° and 13.7 parts of phosphorus trichloride are slowly added. The batch is held at the boiling temperature for 12 hours to allow for complete reaction. It is then cooled to room temperature and the precipitated reaction product is filtered, washed with water, mixed thoroughly with ethanol, filtered and dried.

The colourless crystalline compound of formula

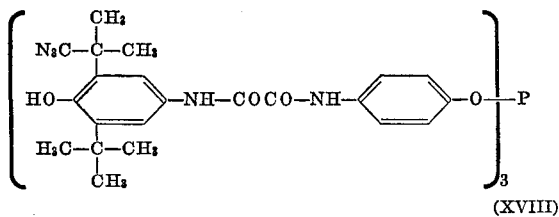

(XVIII)

thus obtained melts at 216–219°. In place of pyridine an equivalent amount of N,N-dimethyl cyclohexylamine can be used.

Example 5

The reaction described in Example 4 is terminated at an earlier point, if desired after 1 hour, and the product worked up as in that Example. This procedure results in the diphosphite of formula

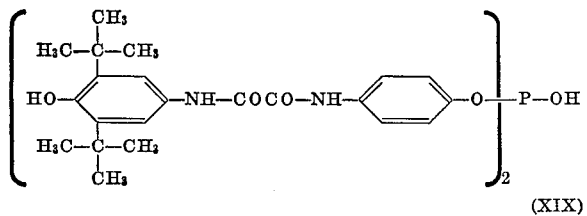

(XIX)

which melts at 165–175°.

The same compound is obtained when the quantitative ratio is changed and only 1.5 to 2.0 mols of the aforenamed dihydroxyoxamide are reacted with 1 mol of phosphorus trichloride.

The organic phosphorus compounds produced from phosphorus trichloride as described in Examples 1, 3, 4 and 5 are listed in the following table, where they are specified by the chemical constitution and the absorption maxima in nanometer (nm.) units. The latter values are directly relevant to property of practical significance, namely the absorption of ultra-violet rays. The table contains additional examples of compounds which can be produced from phosphorus trichloride in analogy with the aforedescribed procedures.

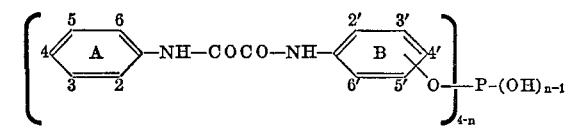

| Example number | Substituent in the ring A | Substituent in the ring B | Value of $n$ | Absorption maximum, $\lambda_{max}$ in nm. |
|---|---|---|---|---|
| 1 | 2-ethyl | 4'-O—P | 1 | 278 |
| 3 | 2-propoxy | 4'-O—P | 1 | 200, 300 |
| 4 | 3,5-di-tert.butyl-4-hydroxy | 4'-O—P | 1 | 288 |
| 5 | do | 4'-O—P—OH | 2 | 285–291, 330 |
| 6 | | 4'-O—P | 1 | 275–280 |
| 7 | | 3'-O—P | 1 | 280–285 |
| 8 | 2-ethoxy | 2'-methyl-4'-O—P | 1 | 300–310 |
| 9 | do | 2'-O—P—OH | 2 | 305 |
| 10 | 2-octyloxy | 2'-O—P | 1 | 308 |
| 11 | 2-hexadecyloxy | 2'-O—P—OH | 2 | 302–308 |
| 12 | 2,5-diethoxy | 3'-O—P | 1 | 310–318 |
| 13 | 2-ethyl | 3'-O—P | 1 | 275–280 |
| 14 | 2-hydroxy | 3'-O—P | 1 | 300–310 |
| 15 | 2-ethoxy | 3'-O—P | 1 | 300 |
| 16 | 2-propoxy | 3'-O—P | 1 | 300 |
| 17 | 2-butoxy | 3'-O—P | 1 | 300 |
| 18 | 2-octyloxy | 3'-O—P | 1 | 300 |
| 19 | 2-dodecyloxy | 3'-O—P | 1 | 300 |
| 20 | 2-hexadecyloxy | 3'-O—P | 1 | 300 |
| 21 | 2,4-dimethyl | 3'-O—P | 1 | 275–300 |
| 22 | 2,5-dimethyl | 3'-O—P | 1 | 275–300 |
| 23 | 2-hydroxy | 4'-O—P | 1 | 300–310 |
| 24 | 2-ethoxy | 4'-O—P | 1 | 300 |
| 25 | 2-butoxy | 4'-O—P | 1 | 280–300 |
| 26 | 2-octyloxy | 4'-O—P | 1 | 280–300 |
| 27 | 2-dodecyloxy | 4'-O—P | 1 | 280–300 |
| 28 | 2-hexadecyloxy | 4'-O—P | 1 | 300 |
| 29 | 2,4-dimethyl | 4'-O—P | 1 | 280 |
| 30 | 2,5-dimethyl | 4'-O—P | 1 | 280 |
| 31 | 2,5-diethoxy | 4'-O—P | 1 | 300–320 |

EXAMPLES OF APPLICATION

Example a

The compound of formula (XIV) described in Example 1 is incorporated in unstabilized polypropylene in an amount of 0.2% and the material extrusion moulded as panels. After exposure for 300 hours in the Klimatest apparatus at 40° and 75% relative humidity the panels containing the disclosed compound are unchanged, whereas a panel without the additive shows hair cracks and brittleness.

In addition the stated compound of this invention imparts much greater heat stability; with the incorporated 0.2% test mouldings turn brittle only after 11 days' exposure at 140°, while only one day at this temperature is sufficient to cause brittleness in mouldings without the incorporated compound.

In the ageing test at 190° brittleness appears after 30 minutes in a test moulding without the additive, but not until 272 minutes in one containing the additive.

Example b 0.5% of the phosphite described in Example 14 is incorporated in stabilized polypropylene. A moulding of this material has to be heated at 190° for 800 minutes in the oxygen ageing test before degradation of the polypropylene sets in. If in place of the phosphite of Example 14 the starting compound of that example, 2,3'-dihydroxy-N,N'-diphenyloxamide, which contains no phosphorus, is incorporated in the polypropylene, the moulded article is degraded after an exposure period of only 490 minutes.

Example c

In a similar manner as in example b the phosphite described in example 24 is compared with the starting compound, the 2-ethoxy-4'-hydroxy-N,N' - diphenyloxamide. The exposure period necessary for degradation is 900, respectively 540 minutes.

Example d

The comparison made as in the examples b and c of the stabilizing effect of the phosphite described in example 29 with the 2,4-dimethyl-4'-hydroxy-N,N'-diphenyloxamide gives the following result: 1240, respectively 362 minutes.

Formulae of representative stabilizers of the foregoing Examples are as follows:

Example 9

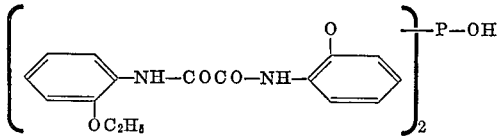

Example 12

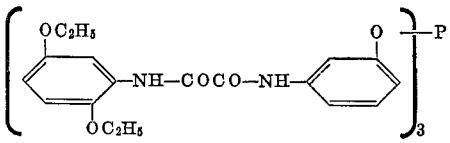

Example 23

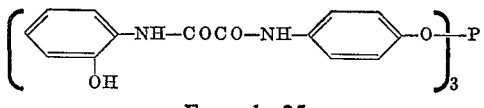

Example 25

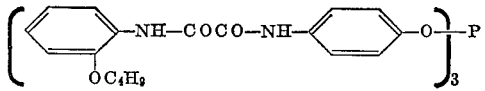

Example 29

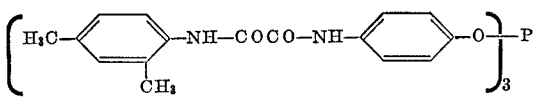

What is claimed is:

1. A compound of the formula

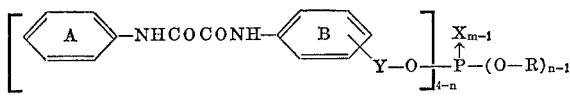

wherein the benzene nuclei A and B are unsubstituted or substituted by alkyl, alkoxy, cycloalkyl, hydroxyl or halo;
$m$ is 1 or 2;
$n$ is 1, 2 or 3;
R is hydrogen, phenyl or substituted or unsubstituted alkyl or cycloalkyl;
X is O or S, and
Y is a direct single bond or an alkylene radical of 1 to 9 carbon atoms which is bound to the benzene nucleus directly or through oxygen or sulfur and which may be interrupted by oxygen atoms
any alkyl or alkoxy group jointly with any substituents present contains 1 to 22 carbon atoms, any cycloalkyl radical is cyclopentyl, cyclohexyl or cycloheptyl and may be substituted by 1 or 2 methyl groups, any substituent on an alkyl radical is alkoxy, cyano, alkylmercapto or fluoro and any substituent on an alkoxy group is alkoxy.

2. A compound according to claim 1 wherein Y is a direct single bond or a member of the group consisting of ethylene, 1,2-propylene; 1,3-propylene; 1,4-butylene;

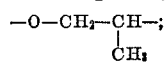

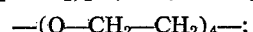

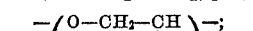

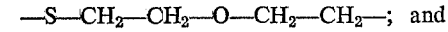

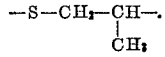

3. A compound according to claim 2 wherein Y is a direct single bond.

4. A compound according to claim 1 wherein any alkyl or alkoxy group, jointly with any substituent thereon, contains 1 to 8 carbon atoms.

5. A compound according to claim 1 wherein $m$ is 1.

6. A compound according to claim 1 wherein R is hydrogen.

7. A compound according to claim 3 wherein $m$ is 1, $n$ is 1 or 2, R is hydrogen, and any alkyl or alkoxy substituent on the nuclei A and B contains 1 to 8 carbon atoms and any halo substituent on the nuclei A and B is bromo or chloro.

8. A compound according to claim 3 of formula

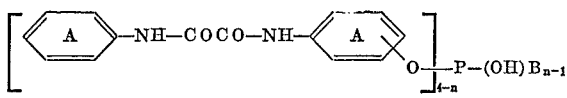

where $n$ stands for the number 1 or 2, the benzene ring A is unsubstituted, monosubstituted by hydroxyl, mono or di substituted by alkyl of up to 9 carbon atoms or alkoxy of up to 16 carbon atoms or mono or di substituted by alkyl or alkoxy as defined above and further mono substituted by hydroxyl, said hydroxyl group being in ortho-position with respect to an N atom or to a tertiary alkyl radical, and where the benzene ring B is unsubstituted or is substituted by one methyl group.

9. A compound according to claim 3 of formula

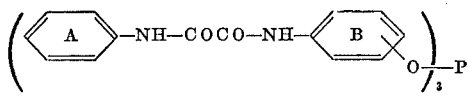

where the benzene ring A is unsubstituted, monosubstituted by hydroxyl, mono or di substituted by alkyl of up to 9 carbon atoms or alkoxy of up to 16 carbon atoms or mono or di substituted by alkyl or alkoxy as defined above and further mono substituted by hydroxyl, said hydroxyl group being in ortho-position with respect to an N atom or to a tertiary alkyl radical, and where the benzene ring B is unsubstituted or is substituted by one methyl group.

10. A compound according to claim 3 formula

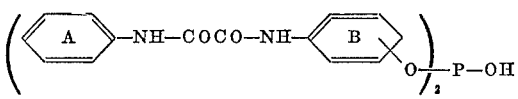

where the benzene ring A is unsubstituted, monosubstituted by hydroxyl, mono or di substituted by alkyl of up to 9 carbon atoms or alkoxy of up to 16 carbon atoms or mono or di substituted by alkyl or alkoxy as defined above and further mono substituted by hydroxyl, said hydroxyl group being in ortho-position with respect to an N atom or to a tertiary alkyl radical, and where the benzene ring B is unsubstituted or is substituted by one methyl group.

11. The organic phosphorus compound according to claim 8 of formula

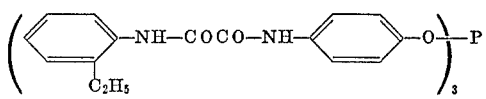

12. The organic phosphorus compound according to claim 8 of formula

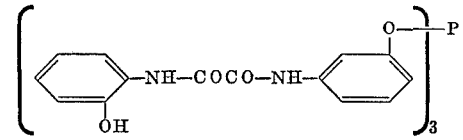

13. The organic phosphorus compound according to claim 8 of formula

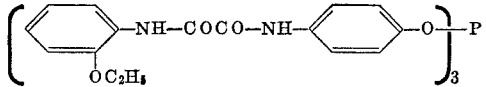

14. The organic phosphorus compound according to claim 8 of formula

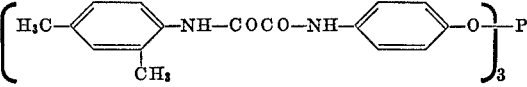

15. The organic phosphorus compound according to claim 8 of formula

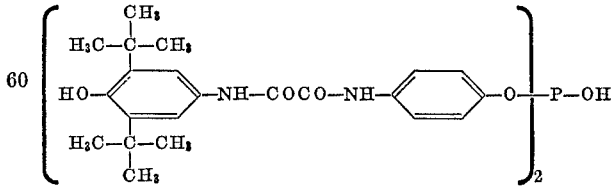

References Cited
UNITED STATES PATENTS 3,293,328  12/1960  Berkelhammer et al. __ 260—944
3,382,300   5/1968  Uchujama et al. _____ 260—944

LORRAINE A. WEINBERGER, Primary Examiner

R. L. RAYMOND, Assistant Examiner

U.S. Cl. X.R.

260—45.9 R, 940